United States Patent
Yun et al.

(10) Patent No.: US 12,053,695 B2
(45) Date of Patent: Aug. 6, 2024

(54) METHOD AND DEVICE FOR PROVIDING MOTION EFFECT

(71) Applicant: POSTECH RESEARCH AND BUSINESS DEVELOPMENT FOUNDATION, Pohang-si (KR)

(72) Inventors: Gyeo Re Yun, Daegu (KR); Seung Moon Choi, Pohang-si (KR)

(73) Assignee: POSTECH Research and Business Development Foundation, Pohang-si (KR)

(*) Notice: Subject to any disclaimer, the term of this patent is extended or adjusted under 35 U.S.C. 154(b) by 0 days.

(21) Appl. No.: 17/738,594

(22) Filed: May 6, 2022

(65) Prior Publication Data

US 2022/0370904 A1 Nov. 24, 2022

(30) Foreign Application Priority Data

May 7, 2021 (KR) .......... 10-2021-0059090
May 4, 2022 (KR) .......... 10-2022-0055380

(51) Int. Cl.
*A63F 13/213* (2014.01)
*A63F 13/215* (2014.01)
*A63F 13/50* (2014.01)
*A63F 13/65* (2014.01)

(52) U.S. Cl.
CPC .......... *A63F 13/50* (2014.09); *A63F 13/213* (2014.09); *A63F 13/215* (2014.09); *A63F 13/65* (2014.09)

(58) Field of Classification Search
CPC ...... A63F 13/213; A63F 13/218; A63F 13/28; A63F 13/285; A63F 13/424; A63F 13/50; A63F 13/54; A63F 13/57; A63F 13/67
See application file for complete search history.

(56) References Cited

U.S. PATENT DOCUMENTS

| | | | | |
|---|---|---|---|---|
| 11,468,611 | B1* | 10/2022 | Richter | G06V 20/40 |
| 2011/0081082 | A1* | 4/2011 | Jiang | G10L 25/00 382/224 |
| 2015/0109528 | A1 | 4/2015 | Choi et al. | |
| 2017/0365102 | A1* | 12/2017 | Huston | G06F 16/954 |
| 2018/0227063 | A1* | 8/2018 | Heubel | G08B 6/00 |
| 2020/0012347 | A1* | 1/2020 | Wu | G08B 6/00 |
| 2022/0214749 | A1* | 7/2022 | Park | A63F 13/355 |

FOREIGN PATENT DOCUMENTS

| | | |
|---|---|---|
| KR | 10-1507242 B1 | 3/2015 |
| KR | 10-2015-0101284 A | 9/2015 |
| KR | 10-2018-0122171 A | 11/2018 |
| KR | 10-2217414 B1 | 2/2021 |

OTHER PUBLICATIONS

Korean Office Action dated May 31, 2023 in Korean Application No. 10-2022-0055380.

* cited by examiner

*Primary Examiner* — Omkar A Deodhar
(74) *Attorney, Agent, or Firm* — Sughrue Mion, PLLC

(57) ABSTRACT

Provided is a device for providing motion effects, the device including a first detector configured to detect a movement of a specific object in a video of a content; a second detector configured to detect a sound event from an audio of the content; and a motion synthesizing unit configured to generate a synthesized motion by synthesizing a first motion corresponding to the movement of the specific object and a second motion generated based on the sound event.

18 Claims, 8 Drawing Sheets

METHOD AND DEVICE FOR PROVIDING MOTION EFFECT

CROSS-REFERENCE TO RELATED APPLICATIONS

This application is based on and claims priority under 35 U.S.C. § 119 to Korean Patent Application Nos. 10-2021-0059090, filed on May 7, 2021 and Nos. 10-2022-0055380, filed on May 4, 2022, in the Korean Intellectual Property Office, the disclosures of which are incorporated by reference herein in their entireties.

BACKGROUND

1. Field

One or more embodiments relates to a method of providing motion effects by analyzing contents in real time in a multisensory media system.

2. Description of the Related Art

In general, in a gameplay video, there are various audio-visual events with a highly attractiveness in addition to the movement of a character. For example, in a first-person shooter (FPS) game, there are highly attractive events such as the use of guns and various techniques, ambient explosion sounds, and hits. However, in the case of using the conventional automatic authoring algorithm, since audio-visual event of a game is not reflected in a motion effect, the immersion level of a game is not high.

SUMMARY

One or more embodiments include real-time analysis of content and automatic generation of motion effects corresponding thereto.

Additional aspects will be set forth in part in the description which follows and, in part, will be apparent from the description, or may be learned by practice of the presented embodiments of the disclosure.

According to one or more embodiments, a device for providing motion effects, the device includes a first detector configured to detect a movement of a specific object in a video of a content; a second detector configured to detect a sound event from an audio of the content; and a motion synthesizing unit configured to generate a synthesized motion by synthesizing a first motion corresponding to the movement of the specific object and a second motion generated based on the sound event.

The device may further include a motion effect providing unit configured to provide a motion effect by converting the synthesized motion into a motion command mn implementable within an operating range of a motion platform.

The second motion may be generated based on the sound event and a visual feedback corresponding to the sound event within a video frame at a time point at which the sound event is detected.

The second motion may be generated based on at least one of a direction of a sound source of the sound event and a sound volume.

The visual feedback may include an event object within pixels corresponding to the sound event or a movement of the event object.

The second motion may be generated through semantic segmentation and sound source segmentation.

The motion synthesizing unit may apply different weights to the first motion and the second motion, respectively.

The content may be a game play video, and the specific object may be a character of the game play video.

The content may be a game play video, and a user may move a character and execute an action in the game play video through a game execution unit.

According to one or more embodiments, a method of providing motion effects, the method includes executing an action while a character is being moved in a game play video through a game execution unit; detecting, by a first detector, a movement of the character in a video of the game play video; detecting, by a second detector, a sound event from an audio of the game play video; and generating a synthesized motion, by a motion synthesizing unit, by synthesizing a first motion corresponding to the movement of the character and a second motion generated based on the sound event.

The method may further include providing, by a motion effect providing unit, a motion effect by converting the synthesized motion into a motion command mn implementable within an operating range of a motion platform.

According to one or more embodiments, a motion effect providing device may provide a motion effect corresponding to audio as well as video provided from content while using the content in real time, and thus a user may immersely use the content.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
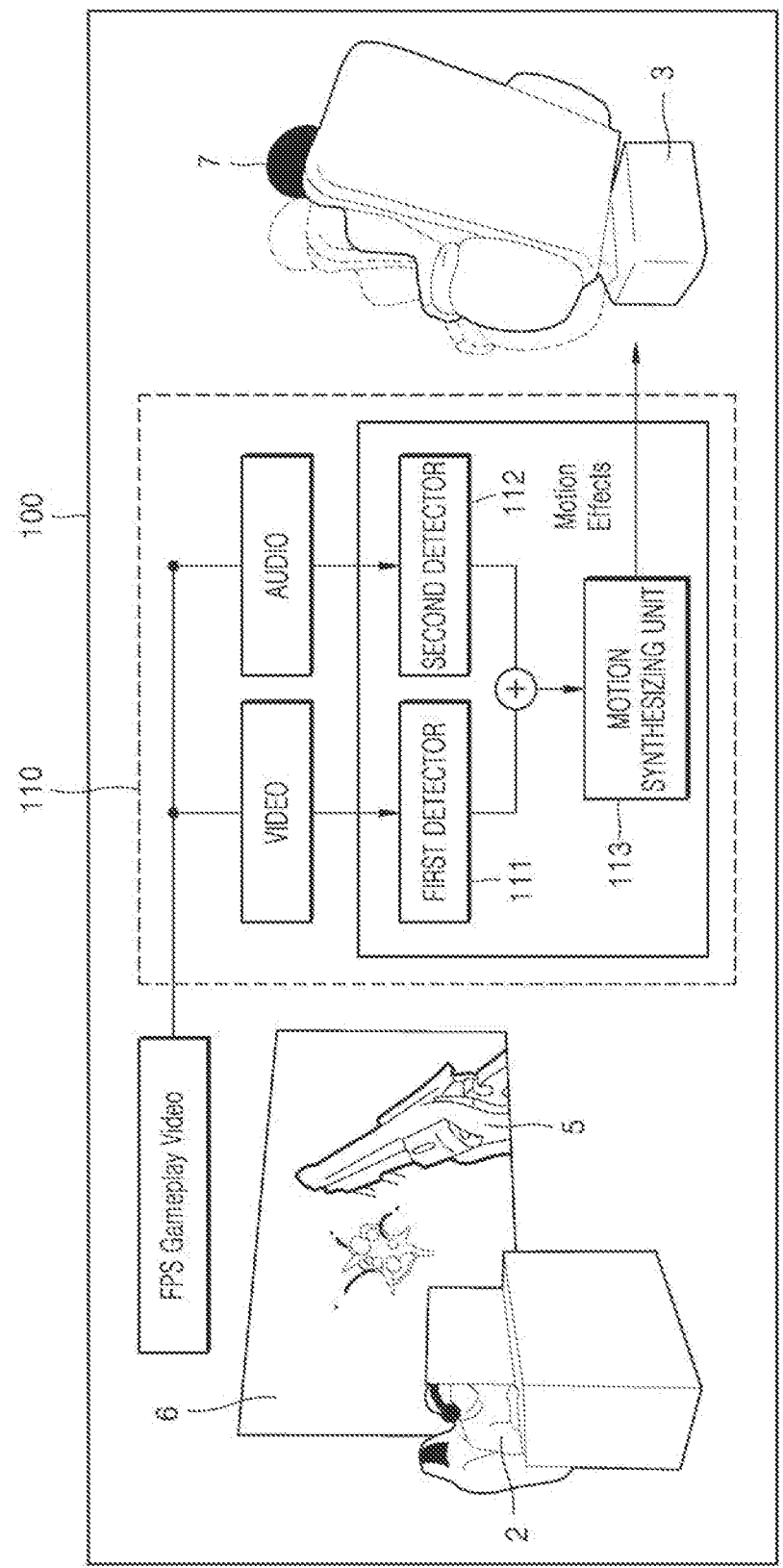
FIG. 1 is a diagram showing an example of a multisensory media system in which a device of providing motion effects is implemented according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram showing an example of a multisensory media system 100 in which a method of providing motion effects is implemented according to one or more embodiments. The multisensory media system 100 includes a 4-dimensional (4D) platform, a game platform, a virtual reality platform, etc.

In the multisensory media system 100 in which a first-person shooting (FPS) game shown in FIG. 1 is executed, an experience of immersion to the game may be provided to a game player 2 or game viewers 7 using a motion platform 3 by providing motion effects like moving, vibrating, or shaking the motion platform 3 in response to an action or an event that a character in a game video takes or undergoes.

The multisensory media system 100 may generate motion effects based on actions that a character may take in a game video, an event the character undergoes, and an event with high audio-visual attraction occurring in the surrounding environment of the character. Examples of the events may include the use of guns and weapons, hits from opponents, and ambient explosion sounds.

The multisensory media system 100 includes a screen 6 for displaying a game play video 5, the motion platform 3, and a motion effect providing device 110 for generating motion effects. The screen 6 includes various types of displays. The motion platform 3 is also known as a motion simulator and includes a motion chair, for example.

The multisensory media system 100 may provide a motion effect generated based on a synthesized motion generated through the game play video 5 to the motion platform 3. For example, when the game player 2 executes an action while moving a specific character of the game play video 5 through a game execution unit, a motion effect may be provided to the motion platform 3 according to a movement and an action of the character.

The motion effect providing device 110 includes a first detector 111 for detecting a movement of a character in the game play video 5, a second detector 112 for detecting a sound event in the audio of the game play video 5, and a motion synthesizing unit 113. The motion synthesizing unit 113 generates a synthesized motion by synthesizing a first motion corresponding to a movement of a character in a video and a second motion generated based on a sound event. Detailed descriptions of the motion effect providing device 110 will be given below with reference to FIG. 2.

Figure 2:
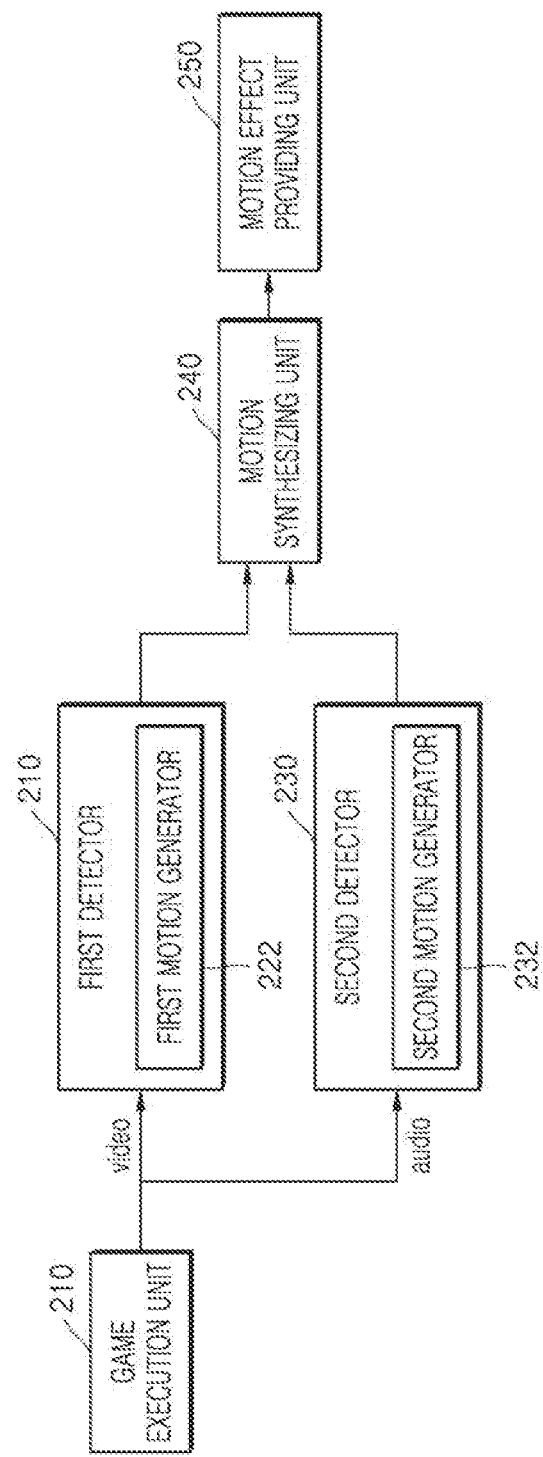
FIG. 2 is a diagram showing an example of a motion effect providing device according to one or more embodiments.

FIG. 2 is a diagram showing an example of a motion effect providing device 200 according to one or more embodiments.

According to one or more embodiments, the motion effect providing device 200 includes a first detector 220, a second detector 230, and a motion synthesizing unit 240. Also, according to some embodiments, the motion effect providing device 200 further includes a motion effect providing unit 250.

The motion effect providing device 200 receives a content, analyzes a received content in real time, and generates and outputs a motion effect. A motion effect generated by the motion effect providing device 200 may be used as a control signal for controlling a motion platform.

Contents that may be received by the motion effect providing device 200 includes a movie, a 4D attraction, a game, etc. The motion effect providing device 200 separates a received content into video and audio. The motion effect providing device 200 may further include a game execution unit 210 when a received content is a game. A user may move a character in a game play video and execute an action through the game execution unit 210.

The first detector 220 detects a movement of a specific object in the video of the content. The first detector 220 further includes a first motion generator 222, and the first motion generator 222 generates a first motion corresponding to the movement of the specific object.

The second detector 230 detects a sound event from the audio of the content. The second detector 230 further includes a second motion generator 232, and the second motion generator 232 generates a second motion based on the sound event.

The motion synthesizing unit 240 generates a synthesized motion by synthesizing the first motion with the second motion.

The motion effect providing unit 250 provides a motion effect by receiving a synthesized motion generated by the motion synthesizing unit 240 and converting the synthesized motion into a motion command mn that may be implemented within the operating range of a motion platform.

Components shown in FIG. 2 will be described below in more detail.

The first detector 220 detects a movement of a specific object in a video. The first detector 220 may perform machine learning to detect a movement of a specific object. Also, since movements of a character coincide with movements of a camera in a first-person game, to detect a movement of the character, a camera viewpoint movement analysis method as in an embodiment shown in FIG. 3 may be used.

Figure 3:
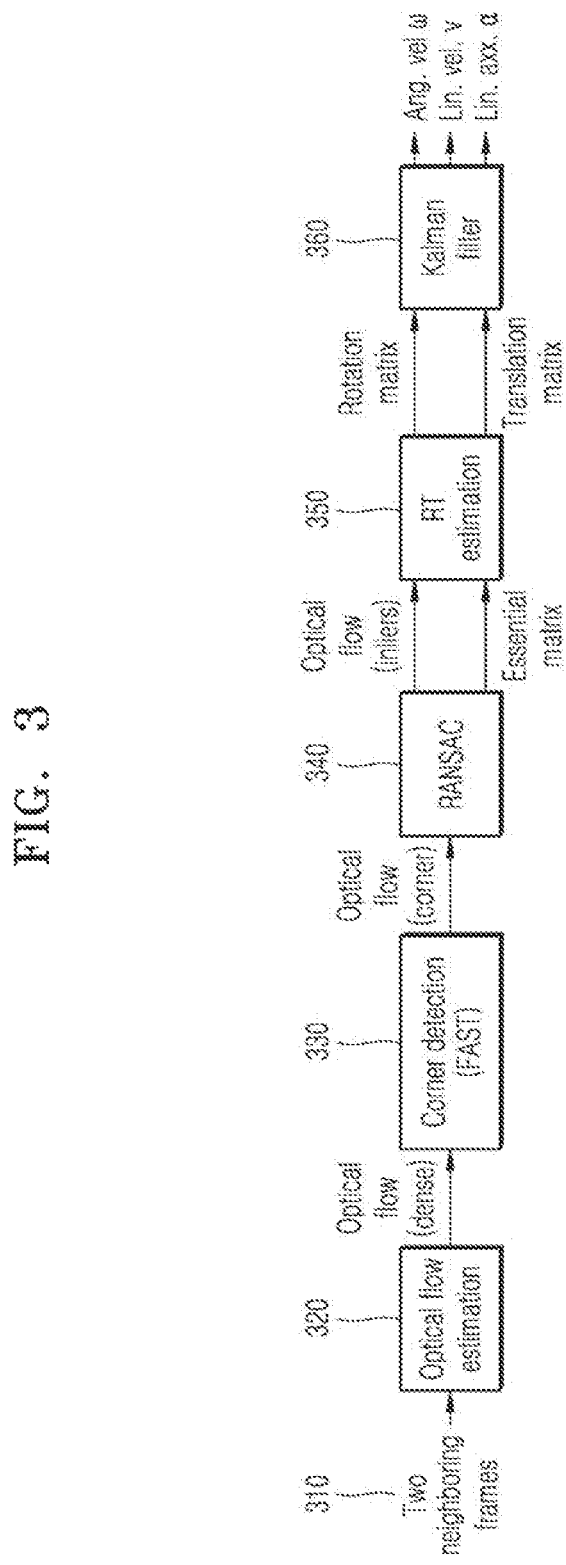
FIG. 3 is a diagram showing a process of detecting a motion of a specific object in a video according to one or more embodiments.

The camera viewpoint movement analysis method of FIG. 3 will be described below. An optical flow estimator 320 receives a current frame and a previous frame (neighboring frames 310) and determines estimated movement values of respective pixels in the current frame and the previous frame. The current frame and the previous frame refer to a current frame and a previous frame of a video received by a first detector (220 of FIG. 2). A corner detector 330 selects corner points that may become feature points in a frame at high speed by using a FAST algorithm. A RANSAC unit 340 receives corner points detected by the corner detector 330 and outputs an essential matrix for estimating movements of a camera and inliers between the current frame and the previous frame. An RT estimator 350 estimates a rotation matrix and a transformation matrix from a received essential matrix. A Kalman filter 360 processes the rotation matrix and the transformation matrix and obtains an angular velocity, a linear velocity, and a linear acceleration of a camera motion. The first motion generator 222 generates a first motion based on at least one of the angular velocity, the linear velocity, and the linear acceleration of the camera motion.

Figure 4:
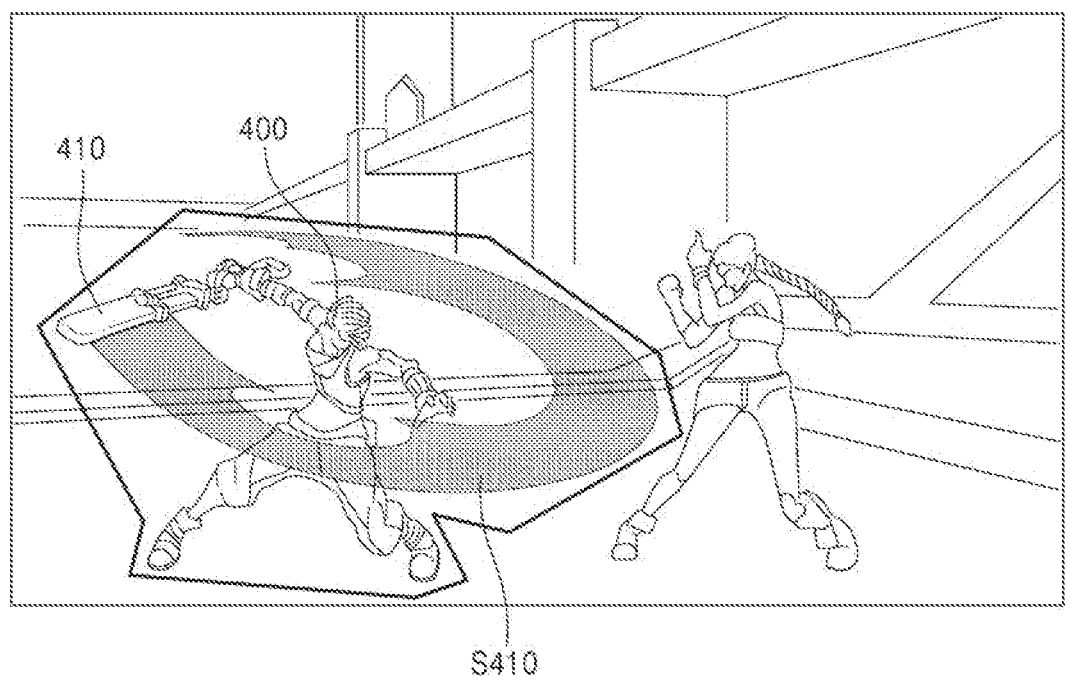
FIG. 4 is a diagram showing an example of detecting a first motion when a character wields a sword held by the character according to one or more embodiments.

FIG. 4 is a diagram showing an example of detecting a first motion when a character wields a sword held by the character according to one or more embodiments.

The first detector 220 detects a movement of a specific object in a video. The movement of the specific object includes an action of a character. Referring to FIG. 4, when a character 400 wields a weapon 410, the first detector 220 may detect an action S410 of wielding the weapon 410. The first motion generator 222 generates a first motion corresponding to a movement of the weapon 410. To this end, an image segmentation technique or a posture estimation technique may be used.

When it is assumed that, in FIG. 4, only a first motion in which the weapon draws a large circle is detected and no sound event is detected, a motion effect providing device may generate a motion effect, such that a motion platform draws a large circle corresponding to the first motion.

The second detector 230 detects a sound event from the audio of the content. According to one or more embodiments, the sound event refers to a sound pre-set by a user. Examples of preset sound events may include an impact sound that is generated at a rough and short moment, such as a gunshot, an explosion sound, and a hitting sound. Sound events in the audio of content may be detected through machine learning like a DNN.

According to one or more embodiments, when a sound event is detected, the second detector 230 determines whether a visual feedback corresponding to the sound event exists within a video frame at a time point at which the sound event is detected.

When there is no visual feedback and only the sound event is detected by the second detector 230, the second motion generator 232 generates a second motion based on only the sound event. Also, when the second detector 230 detects a visual feedback corresponding to the sound event in addition to the sound event, the second motion generator 232 generates a second motion based on the sound event and the visual feedback.

Referring to Equation 1, the second motion may be defined as a vector sum of a second auditory motion and a second visual motion.

$$\text{The second motion} = \alpha \text{ secondary auditory motion} (M2_A) + (1-\alpha) \text{ secondary visual motion } (M2_V). \quad \text{Equation 1}$$

In Equation 1, $\alpha$ denotes a weight.

When only a sound event exists, the second motion is the same as a second auditory motion. When both a sound event and a visual feedback exist, the second motion becomes the vector sum of the second auditory motion and the second visual motion. Weights may be assigned to the second auditory motion generated based on the sound event and the second visual motion generated based on the visual feedback, respectively. A weight may be a pre-set value.

According to one or more embodiments, a process of generating the second motion when only a sound event exists is as follows.

The second motion generator 232 sets the value of the second visual motion in Equation 1 to 0. Therefore, the second motion corresponds to the second auditory motion value generated only with sound information regarding the sound event.

The second motion generator 232 finds the direction of a sound source through sound segmentation or sound source localization and generates the second motion to have a size corresponding to the size of the sound source of the sound event. Then, the second motion is generated in a direction opposite to the direction of the sound source.

For example, when a game player is hit, a sound event is detected, but there is no visual feedback corresponding to the sound event. The second motion generator 232 generates the second motion to have a size corresponding to a sound level of a hit event, finds the direction of a hit sound source, and generates the second motion in a direction opposite to the direction of the hit sound source. When the motion effect providing device provides a motion effect based on the second motion, a user may feel a feedback force corresponding to a hit.

According to one or more embodiments, a process of generating a second motion when a sound event is detected and a visual feedback is detected will be described later with reference to FIG. 5. FIG. 4 is a diagram showing an example of a motion S520 when a gun is lifted by a recoil when a character shoots the gun.

When a gunshot sound is detected as a sound event, the second detector 230 determines whether a visual feedback S420 corresponding to the gunshot sound exists in a frame at a time point t of detection of the gunshot sound and a frame at a time point (t+1). In FIG. 4, a visual feedback may be an event object detected in the frame at the time point t or the frame at the time point (t+1). Alternatively, the visual feedback may be a movement of an event object detected in the frame at the time point t and the frame at the time point (t+1). An event object refers to an object that generated a sound event. In FIG. 4, the gun is an event object.

In order to detect a visual feedback within at least one frame in which a sound event is detected, the second detector 230 may use a semantic segmentation technology that divides an object in a video into semantic units or a sound source segmentation technique for specifying the location of a subject generating auditory signals in a video.

When the second detector 230 detects the gunshot sound in a frame 500 at the time point t and a frame 510 at the time point t+1, the second detector 230 determines whether there is a gun corresponding to the gunshot sound in the frames at the time point t 500 and the time point t+1 510. After the second detector 230 detects a gun in pixels corresponding to positions of a sound source at which the gunshot sound is detected in the frame 500 at the time point t and the frame 510 at the time point t+1, the second detector 230 may detect a movement S520 of a gun 511 between the frame 500 at the time point t and the frame 510 at the time point t+1.

The second motion generator 232 generates a second auditory motion based on the magnitude and the direction of the gunshot sound and generates a second visual motion based on a visual feedback S520 that the gun is lifted. Next, a second motion is generated based on the second auditory motion and the second visual motion. Pre-set weight values may be applied to the second auditory motion and the second visual motion, respectively.

For example, when a gunshot sound is detected from the audio of content and a recoil of a gun is detected from the video of the content, a motion effect providing device may provide the effect that, according to the recoil of the gun, a motion chair is instantly lifted up, is suspended for a while, and slowly and smoothly moves downward. Detailed descriptions thereof will be given later with reference to FIG. 7.

Figure 6:
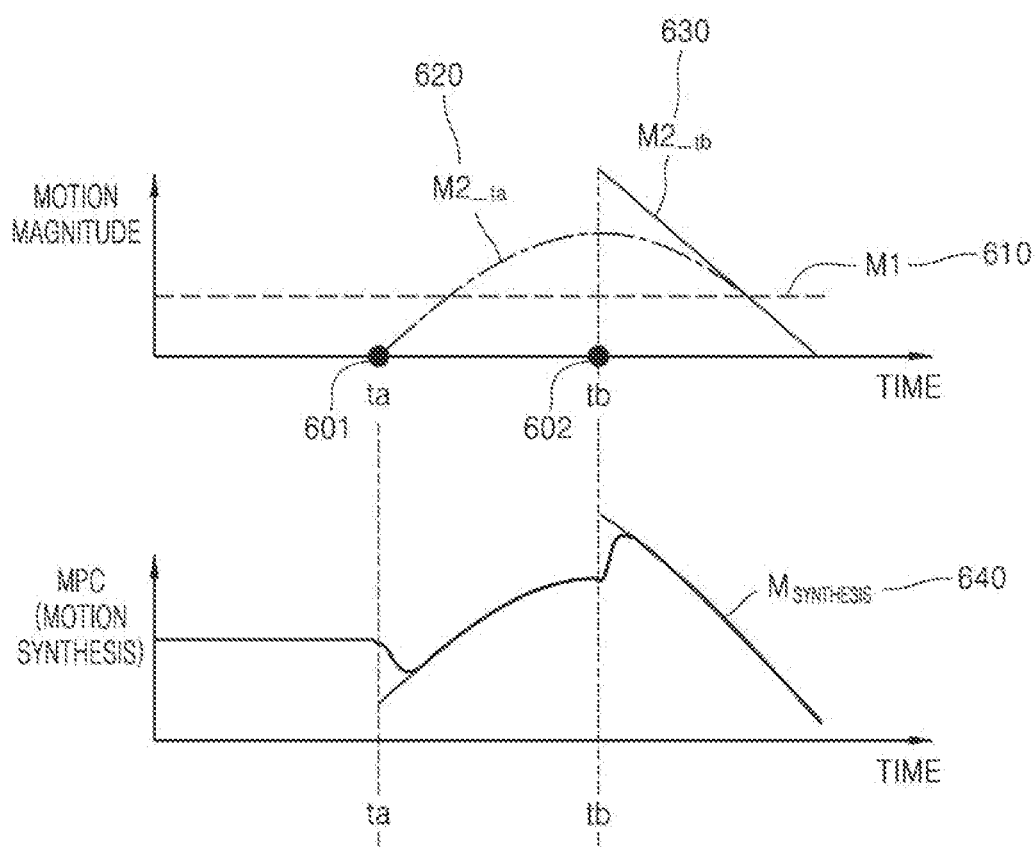
FIG. 6 is a diagram showing an example of generating a synthetic motion according to one or more embodiments.

The motion synthesizing unit 240 generates a synthesized motion by synthesizing the vector value of the first motion with the vector value of the second motion. FIG. 6 is a diagram showing an example of synthesizing a first motion and a second motion in a motion synthesizing unit according to one or more embodiments.

Referring to FIG. 6, the motion synthesizing unit 240 synthesizes a first motion M1 detected while a character is moving, a second motion $M2_{ta}$ detected based on a gunshot sound detected at a time point ta 601, and a second motion $M2_{tb}$ detected based on an explosion sound detected at a time point tb 602.

M1 denotes a first motion detected when a character in a video moves at a constant speed.

Figure 5:
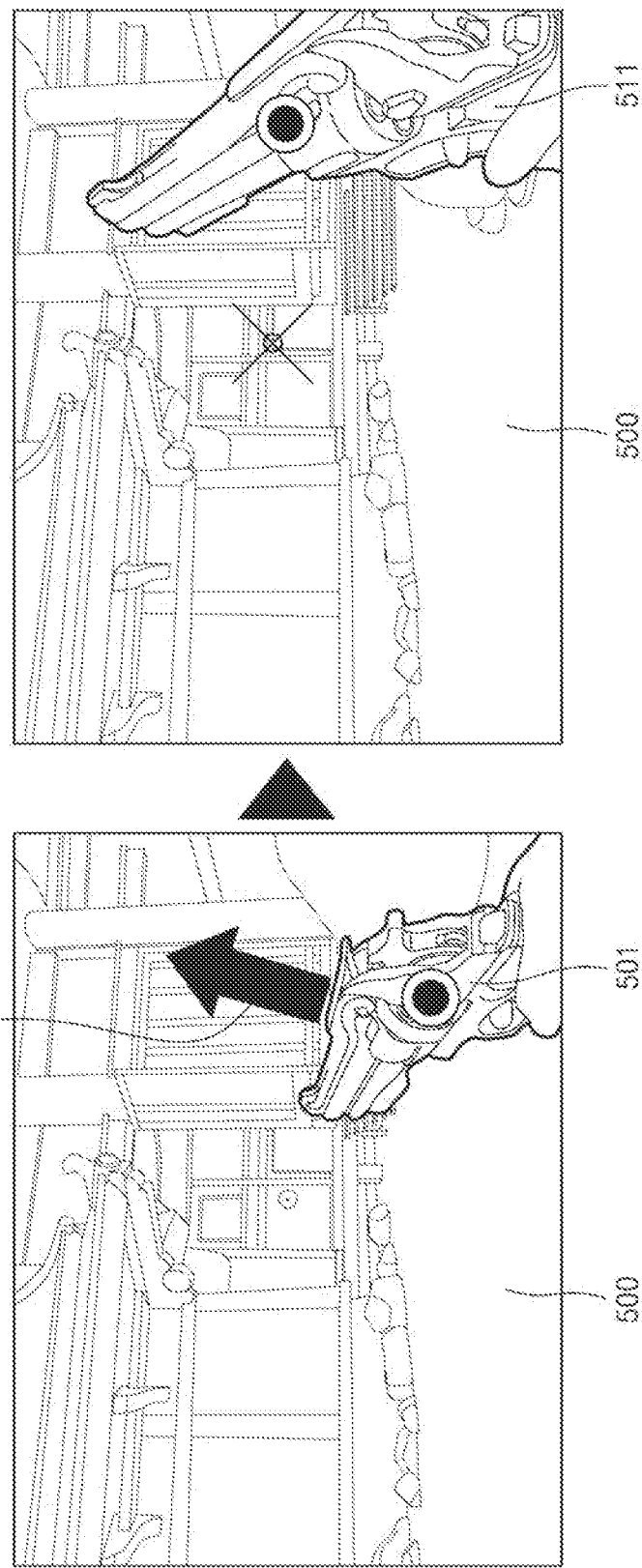
FIG. 5 is a diagram showing an example of a motion when a gun is lifted by a recoil when a character shoots the gun.

$M2_{ta}$ denotes a second motion generated as a gunshot sound is detected and a gun corresponding to the gunshot sound is detected as in the embodiment of FIG. 5.

$M2_{tb}$ denotes a second motion generated when an explosion sound is detected but a visual feedback corresponding to the explosion sound is not detected.

The motion synthesizing unit 240 generates a synthesized motion M_synthesis 640 by synthesizing M1, M2$_{\_ta}$, and M2$_{\_tb}$. The motion synthesizing unit 240 may assign different weights to M1, M2$_{\_ta}$, and M2$_{\_tb}$, respectively. Also, the motion synthesizing unit 240 may use a model predictive control (MPC) technique. For example, when a bomb explodes at a time point at which a large recoil is generated by a gun after the character fires the gun at the time point tb in FIG. 6, the sum of the magnitudes of motions of M1, M2$_{\_ta}$, and M2$_{\_tb}$ exceeds the maximum displacement of a motion chair. Therefore, weights assigned to M1, M2$_{\_ta}$ and M2$_{\_tb}$ are adjusted, such that the sum of M1, M2$_{\_ta}$ and M2$_{\_tb}$ is within the maximum displacement of the motion chair or a pre-set maximum motion magnitude.

Referring to FIG. 6, the synthesized motion M_synthesis 640 generated by the motion synthesizing unit 240 generates a synthesized motion in which the magnitude of a motion instantly and significantly increases and rapidly decreases when a character fires a gun while moving to the time point ta and when an explosion occurs around the character at the time point tb after the gun is lifted by recoil.

A synthesized motion has the motion of 6 degree of freedom (DoF) in a 3D camera space. On the other hand, a motion platform has only n limited DoF, denoted by a motion command m$_n$.

$m_2$=(roll, pitch)$^T$,
$m_3$=(roll, pitch, heave)$^T$,
$m_4$=(roll, pitch, sway, heave)$^T$,
$m_6$=(roll, pitch, yaw, surge, sway, heave)$^T$ The motion platform is capable of expressing motions of 2 DoF, 3 DoF, 4 DoF, and 6 DoF according to DoF of movable axes, but is generally capable of expressing limited 3 DoF. Therefore, a process of reducing or converting DoF to express 6 DoF motions of a synthesized motion in 3 DoF is needed.

According to one or more embodiments, the motion effect providing unit 250 converts a 6 DOF synthesized motion to a motion command converted or reduced to fit a 3-DOF motion platform by using a motion queuing algorithm and provides the motion command to the motion platform. When a motion command is transmitted to a motion chair, the motion chair controls the movements such as roll, pitch, and heave according to the motion command, and the motion command is reproduced as a motion effect. The motion effect may be implemented in real time along with movements and actions of a character in a game played in real time.

According to one or more embodiments, the motion queuing algorithm may use at least one of a velocity washout filter, an acceleration washout filter, and a tilt coordination acceleration washout filter. Also, the motion queuing algorithm may further include a washout filter for leaving only high-frequency components by using at least one of the angular velocity, the linear velocity, and the linear acceleration of a camera motion obtained in FIG. 3 as an input.

According to one or more embodiments, the motion queuing algorithm may further use a model predictive control (MPC) technique. Even when using the MPC technique, at least one from among a speed input MPC technique, an acceleration input MPC technique, and an acceleration input MPC technique with tilt coordination may be used.

For example, when a character fires a gun while moving in a game play video, a synthesized motion is generated by synthesizing a first motion corresponding to the movement of the character detected in the video and a second motion corresponding to a gunshot sound detected in the audio. The motion effect providing unit 250 reduces the magnitude of the motion of the synthesized motion to be within the maximum displacement of a motion chair by using the MPC technique.

Figure 7:
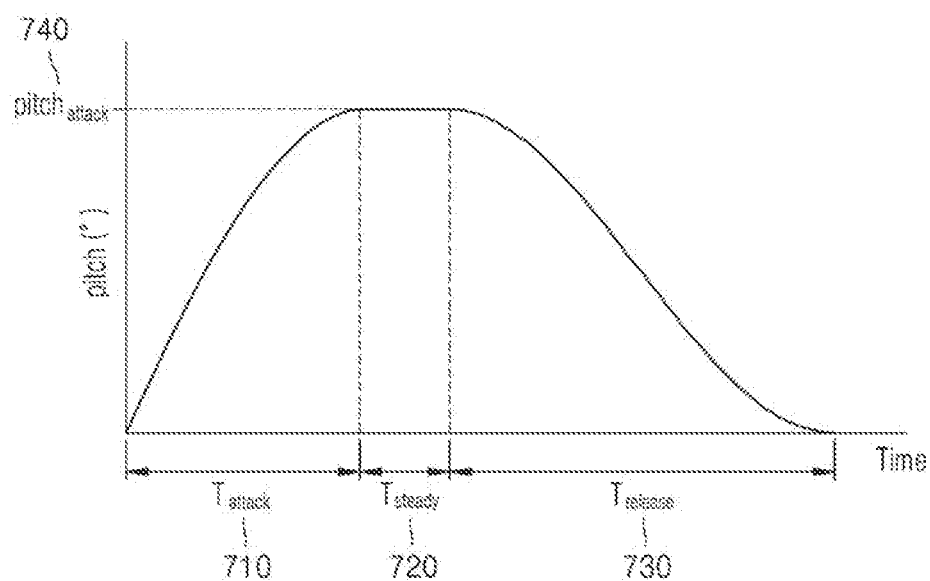
FIGS. 7 and 8 are diagrams showing examples of generating motion effects corresponding to the sound event of FIG. 5 according to one or more embodiments.

FIG. 7 is a diagram showing an example of generating a motion effect corresponding to the sound event of FIG. 5 according to one or more embodiments.

In the embodiment of FIG. 5, a second detector may detect a gunshot sound as a sound event from the audio of content and may further detects a visual feedback in which a gun is quickly lifted, is temporarily suspended, and moves down to the original position in a video frame corresponding to the gunshot sound.

Based on the sound event and the visual feedback, a motion synthesizing unit may generate a synthesized motion corresponding to an attack section T$_{attack}$ 710 in which the gun is quickly lifted, a steady section T$_{steady}$ 720, in which the gun is temporarily suspended, and a release section T$_{release}$ 730, in which the gun moves down to its original position.

The motion effect providing device provides a motion effect by converting the synthesized motion into a motion command m$_n$ that may be implemented within the motion range of a motion platform. For example, since the recoil force of a gun generally acts in the forward and backward directions of the shooter's body, the motion effect providing device provides a motion command mapped as a pitch motion to a 3-DOF motion chair. The motion effect providing device may express the attack section T$_{attack}$ 710 as Pitch$_{attack}$ 740 by expressing an instantaneous impact force due to the recoil as a quarter cycle of a sine wave. A pitch value is maintained in the steady section T$_{steady}$ 720, and the motion chair is moved to an initial value along the half cycle of a cosine function in the release section T$_{release}$ 730.

Figure 8:
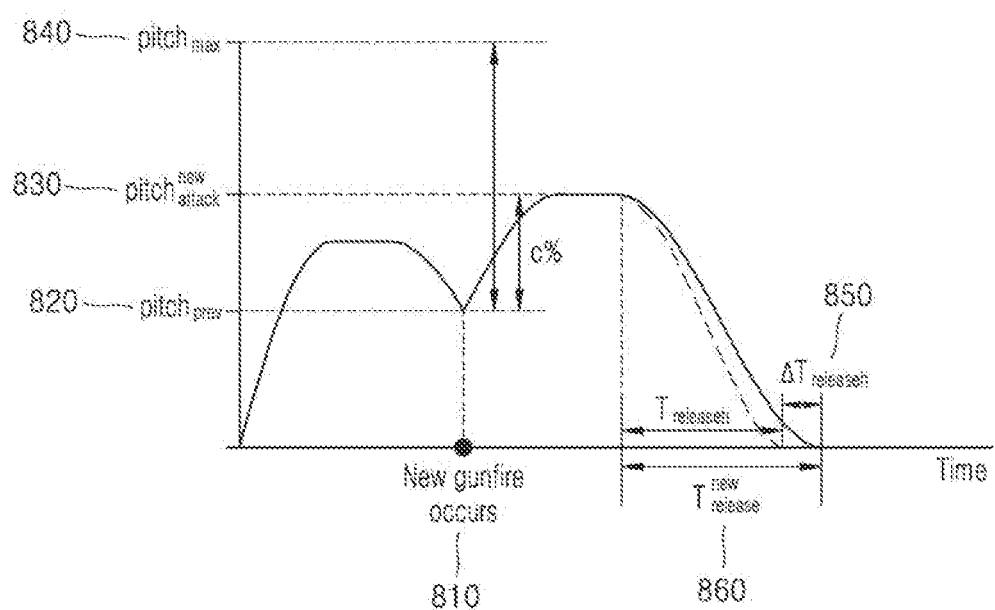

FIG. 8 is a diagram showing an example in which a motion effect is generated when gunshot sounds are repeatedly detected within a short period of time in FIG. 5, according to one or more embodiments.

When gunshot sounds are repeatedly detected within a pre-set short period of time, a motion effect providing device needs to provide a new motion effect before a motion platform returns to its initial position. FIG. 8 shows an example of providing a motion effect when a second gunshot sound 810 is detected before reaching the maximum pitch value 740 of a first gunshot sound after the first gunshot sound is detected in FIG. 7. When the second gunshot sound 810 is detected, a motion effect providing unit limits the driving range of a motion platform by using a MPC technique. When the second gunshot sound 810 is detected, a pitch$_{prev}$ motion effect 820 is provided at a corresponding moment, and the maximum value of a motion effect due to the second gunshot sound 810 may be set to pitch$_{new\ attack}$ 830=pitch$_{prev}$ 820+(c %)pitch$_{max}$ 840. Here, c % may be selected within a range that does not exceed the maximum displacement of the motion platform according to a criterion set in advance by using a MPC technique. Also, the pitch$_{max}$ 840 may use the value of the pitch$_{attack}$ 740 of FIG. 7. Next, a time for providing a motion effect may be adjusted to T$_{new\ release}$ 860, which is increased by $\Delta$T$_{release}$ 850 as compared to FIG. 7. The motion effect providing unit provides a simple motion of repeated pitches to the motion platform when the second gunshot sound 810 is detected.

The method according to one or more embodiments may be implemented as a computer-readable program or codes on a computer-readable recording medium. The computer-readable recording medium includes all types of recording devices in which information readable by a computer system is stored. Also, the computer-readable recording medium may be distributed in a network-connected computer system to store and execute computer-readable programs or codes in a distributed manner.

Also, the computer-readable recording medium may include a hardware device specially configured to store and execute program instructions, such as a ROM, a RAM, and a flash memory.

Although some aspects of one or more embodiments have been described in the context of an apparatus, it may also represent descriptions according to a corresponding method, wherein a block or an apparatus corresponds to a method step or feature of a method step. Similarly, aspects described in the context of a method may also represent a corresponding block, a corresponding item, or a corresponding device feature. Some or all of the method steps may be performed by (or using) a hardware device, e.g., a microprocessor, a programmable computer, or an electronic circuit. In some embodiments, one or more of the most important method steps may be performed by such an apparatus.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A device for providing motion effects, the device comprising:
    a first detector configured to detect a movement of a specific object in a video of a content;
    a second detector configured to detect a sound event from an audio of the content; and
    a motion synthesizing unit configured to:
        generate a synthesized motion by synthesizing a first vector value of a first motion corresponding to the movement of the specific object with a second vector value of a second motion generated based on the sound event, and
        apply different weights to the first motion and the second motion, respectively,
    wherein the second motion is defined as a vector sum of a second auditory motion and a second visual motion, and
    wherein weights are assigned to the second auditory motion generated based on the sound event and the second visual motion generated based on the visual feedback, respectively.

2. The device of claim 1, further comprising
    a motion effect providing unit configured to provide a motion effect by converting the synthesized motion into a motion command mn implementable within an operating range of a motion platform.

3. The device of claim 1, wherein the second motion is generated based on the sound event and a visual feedback corresponding to the sound event within a video frame at a time point at which the sound event is detected.

4. The device of claim 1, wherein the second motion is generated based on at least one of a direction of a sound source of the sound event and a sound volume.

5. The device of claim 3, wherein the visual feedback comprises a movement of an event object within pixels corresponding to the sound event.

6. The device of claim 3, wherein the second motion is generated through semantic segmentation and sound source segmentation.

7. The device of claim 1, wherein the content is a game play video, and the specific object is a character of the game play video.

8. The device of claim 7, wherein the content is a game play video, and a user moves a character and executes an action in the game play video through a game execution unit.

9. A method of providing motion effects, the method comprising:
    executing an action while a character is being moved in a game play video through a game execution unit;
    detecting, by a first detector, a movement of the character in a video of the game play video;
    detecting, by a second detector, a sound event from an audio of the game play video;
    generating a synthesized motion, by a motion synthesizing unit, by synthesizing a first vector value of a first motion corresponding to the movement of the specific object with a second vector value of a second motion generated based on the sound event; and
    applying, by the motion synthesizing unit, different weights to the first motion and the second motion, respectively,
    wherein the second motion is defined as a vector sum of a second auditory motion and a second visual motion, and
    wherein weights are assigned to the second auditory motion generated based on the sound event and the second visual motion generated based on the visual feedback, respectively.

10. The method of claim 9, further comprising providing, by a motion effect providing unit, a motion effect by converting the synthesized motion into a motion command mn implementable within an operating range of a motion platform.

11. The method of claim 9, wherein the second motion is generated based on the sound event and a visual feedback corresponding to the sound event within a video frame at a time point at which the sound event is detected.

12. The method of claim 9, wherein the visual feedback comprises a movement of an event object within pixels corresponding to the sound event.

13. The method of claim 11, wherein the second motion is generated through semantic segmentation and sound source segmentation.

14. A non-transitory computer-readable recording medium having recorded thereon a program for executing the method for providing motion effects of claim 9.

15. A non-transitory computer-readable recording medium having recorded thereon a program for executing the method for providing motion effects of claim 10.

16. A non-transitory computer-readable recording medium having recorded thereon a program for executing the method for providing motion effects of claim 11.

17. A non-transitory computer-readable recording medium having recorded thereon a program for executing the method for providing motion effects of claim 12.

18. A non-transitory computer-readable recording medium having recorded thereon a program for executing the method for providing motion effects of claim 13.

* * * * *